United States Patent
Deshmukh et al.

(10) Patent No.: US 11,792,069 B2
(45) Date of Patent: *Oct. 17, 2023

(54) PROCESSING INSTRUCTIONS TO CONFIGURE A NETWORK DEVICE

(71) Applicant: Juniper Networks, Inc., Sunnyvale, CA (US)

(72) Inventors: Raviraj Satish Deshmukh, Pune (IN); Pradeep H. Krishnamurthy, Bangalore (IN); Varun S K, Shikaripur (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,509

(22) Filed: Sep. 22, 2022

(65) Prior Publication Data

US 2023/0034548 A1 Feb. 2, 2023

Related U.S. Application Data

(63) Continuation of application No. 17/449,617, filed on Sep. 30, 2021, now Pat. No. 11,489,724.

(30) Foreign Application Priority Data

Jun. 24, 2021 (IN) .............................. 202141028389

(51) Int. Cl.
*G06F 15/177* (2006.01)
*H04L 41/0813* (2022.01)
*H04L 41/084* (2022.01)

(52) U.S. Cl.
CPC ...... *H04L 41/0813* (2013.01); *H04L 41/0843* (2013.01)

(58) Field of Classification Search
CPC ................. H04L 41/0813; H04L 41/0843
(Continued)

(56) References Cited

U.S. PATENT DOCUMENTS 6,650,347 B1 * 11/2003 Nulu ................. H04L 67/75
  700/83
10,044,522 B1   8/2018 Shamis et al.
(Continued)

FOREIGN PATENT DOCUMENTS

CN   101853190 A   10/2010
CN   112152835 A   12/2020
EP   3564808 A1   11/2019

OTHER PUBLICATIONS

Enns, "NETCONF Configuration Protocol," Network Working Group, RFC 4741, Dec. 2006, 96 pp.
(Continued)

*Primary Examiner* — Duyen M Doan
(74) *Attorney, Agent, or Firm* — Shumaker & Sieffert, P.A.

(57) ABSTRACT

A controller device includes a memory configured to store a tree structure comprising a plurality of nodes, wherein the tree structure comprises a set of sub-structures, and wherein the tree structure defines a configuration of a network device of a set of network devices such that each node of the plurality of nodes corresponds to a respective resource of the network device. Additionally, the controller device includes processing circuitry configured to receive an instruction to update the configuration of the network device, wherein the instruction to update the configuration of the network device indicates a node of the set of nodes corresponding to the update; and verify, based on a sub-structure of the set of sub-structures corresponding to the node indicated by the instruction, the instruction to update the configuration of the network device.

20 Claims, 4 Drawing Sheets

(58) Field of Classification Search
USPC .................................................. 709/203, 221
See application file for complete search history.

(56) References Cited

U.S. PATENT DOCUMENTS

| | | | |
|---|---|---|---|
| 10,516,761 B1* | 12/2019 | A | ........................... H04L 43/06 |
| 11,165,647 B2 | 11/2021 | A et al. | |
| 11,489,724 B1 | 11/2022 | Deshmukh et al. | |
| 11,575,580 B2* | 2/2023 | Jeuk | .................... H04L 67/1001 |
| 2003/0041088 A1 | 2/2003 | Wilson et al. | |
| 2007/0113186 A1 | 5/2007 | Coles et al. | |
| 2011/0029673 A1 | 2/2011 | Jaisinghani | |
| 2015/0089034 A1* | 3/2015 | Stickle | .................... H04L 41/00 709/223 |
| 2019/0334795 A1* | 10/2019 | Terayama | ........... H04L 41/0895 |
| 2020/0220782 A1* | 7/2020 | Parangattil | .............. H04L 41/22 |
| 2020/0295987 A1 | 9/2020 | Thomasson et al. | |

OTHER PUBLICATIONS

Extended Search Report from counterpart European Application No. 22178505.8 dated Oct. 28, 2022, 11 pp.

Harrington et al., "An Architecture for Describing Simple Network Management Protocol (SNMP) Management Frameworks," Network Working Group, RFC 3411, Dec. 2002, 65 pp.

Notice of Allowance from U.S. Appl. No. 17/449,617 dated Jun. 27, 2022, 10 pp.

First Office Action and Search Report, and translation thereof, from counterpart Chinese Application No. 202210655172.7 dated May 24, 2023, 26 pp.

Response to Communication Pursuant to Rule 69 Communication dated Jan. 9, 2023, from counterpart European Application No. 22178505.8, filed Jun. 26, 2023, 15 pp.

* cited by examiner

PROCESSING INSTRUCTIONS TO CONFIGURE A NETWORK DEVICE

This application is a continuation of U.S. patent application Ser. No. 17/449,617, filed on Sep. 30, 2021, which claims priority to Indian Provisional Patent Application No. 202141028389, filed on Jun. 24, 2021, the entire contents of which is incorporated herein by reference.

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

A controller may perform configuration tasks as well as perform operational commands to collect and view operational data of the managed devices. For example, the controller may configure interface cards of the device, adjust parameters for supported network protocols, specify physical components within the device, modify routing information maintained by a router, access software modules and other resources residing on the device, and perform other configuration tasks. In addition, the controller may allow a user to view current operating parameters, system logs, information related to network connectivity, network activity or other status information from the devices as well as view and react to event information received from the devices.

SUMMARY

In general, this disclosure describes techniques for controlling network devices. For example, a controller may be configured to configure a set of network devices within a network device, and control operations of the set of network devices within the network. A memory of the controller may be configured to store a tree structure comprising a plurality of nodes. The tree structure may define a configuration of a network device of the set of network devices within the network. That is, each node of the plurality of nodes may correspond to a respective resource (e.g., a configuration resource) of the network device. When the controller receives an instruction to update the configuration of the network device, the controller may verify the request based on information in the tree structure. If the instruction includes a request to update the configuration of a resource that is not managed by the controller, for example, the controller may deny the request when the resource does not exist in the tree structure.

The techniques of this disclosure may provide one or more advantages. For example, the tree structure may include a set of sub-structures, where each sub-structure of the set of sub-structures includes a respective set of nodes of the plurality of nodes. When the controller receives an instruction which references a node, the tree structure may identify a sub-structure corresponding to the node and verify the instruction based on the sub-structure corresponding to the node, without verifying the instruction based on other sub-structures of the set of sub-structures. This may allow the controller to verify the instruction more efficiently as compared with controllers that verify instructions based on an entire tree structure. Furthermore, the memory may be configured to store a configuration table comprising a plurality of configuration table entries. Each of these configuration table entries may indicate a path corresponding to a node of the configuration tree and a name of the node, the node corresponding to a respective resource of the network device. The path may indicate the sub-structure corresponding to the node. In this way, the controller may determine, in an instruction which indicates a node, a path corresponding to the node. The controller may search the configuration table to determine whether the determined path corresponds to the path of a node in the tree structure.

In some examples, a controller device includes memory configured to store a tree structure comprising a plurality of nodes, wherein the tree structure comprises a set of sub-structures, each sub-structure of the set of sub-structures comprising a respective set of nodes of the plurality of nodes, and wherein the tree structure defines a configuration of a network device of a set of network devices such that each node of the plurality of nodes corresponds to a respective resource of the network device; and processing circuitry. The processing circuitry is configured to: receive an instruction to update the configuration of the network device, wherein the instruction to update the configuration of the network device indicates a node of the set of nodes corresponding to the update; and verify, based on a sub-structure of the set of sub-structures corresponding to the node indicated by the instruction, the instruction to update the configuration of the network device.

In some examples, a method includes: storing, by a processor in a memory, a tree structure comprising a plurality of nodes, wherein the tree structure comprises a set of sub-structures, each sub-structure of the set of sub-structures comprising a respective set of nodes of the plurality of nodes, and wherein the tree structure defines a configuration (e.g., a configuration model) of a network device of a set of network devices such that each node of the plurality of nodes corresponds to a respective resource of the network device; receiving, by processing circuitry of a controller device, an instruction to update the configuration of the network device, wherein the instruction to update the configuration of the network device indicates a node of the set of nodes corresponding to the update; and verifying, by the processing circuitry based on a sub-structure of the set of sub-structures corresponding to the node indicated by the instruction, the instruction to update the configuration of the network device.

In some examples, a system includes a network device of a set of network devices and a controller device. The controller device includes a memory configured to store a tree structure comprising a plurality of nodes, wherein the tree structure comprises a set of sub-structures, each sub-structure of the set of sub-structures comprising a respective set of nodes of the plurality of nodes, and wherein the tree structure defines a configuration of the network device such that each node of the plurality of nodes corresponds to a respective resource of the network device; and processing circuitry. The processing circuitry is configured to: receive an instruction to update the configuration of the network device, wherein the instruction to update the configuration of the network device indicates a node of the set of nodes corresponding to the update; and verify, based on a sub-structure of the set of sub-structures corresponding to the node indicated by the instruction, the instruction to update the configuration of the network device.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
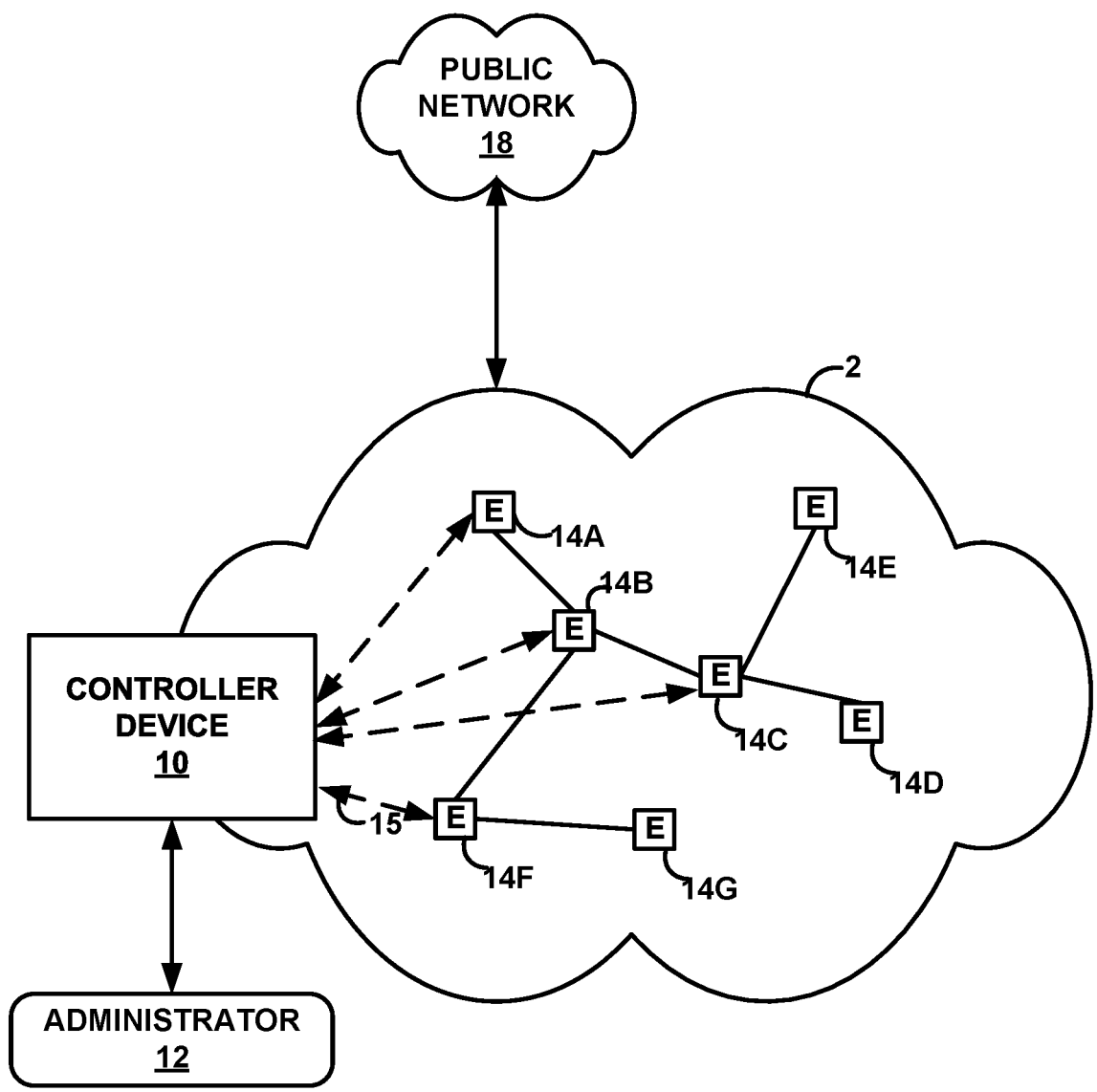
FIG. 1 is a block diagram illustrating an example including elements of an enterprise network that is managed using a controller device, in accordance with one or more techniques of this disclosure.

FIG. 1 is a block diagram illustrating an example including elements of an enterprise network 2 that are managed using a controller device 10, in accordance with one or more techniques of this disclosure. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, controller device 10, also referred to as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 uses controller device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Controller device 10 may establish NETCONF sessions with one or more of elements 14.

In some examples, controller device 10 includes a database that is configured to store a tree structure comprising a plurality of nodes, where the tree structure corresponds to an element of elements 14. For example, the tree structure may correspond to element 14A. The database may be configured to store a tree structure corresponding to any one or more elements of elements 14. The tree structure may define a configuration of element 14A by defining a hierarchy of one or more resources of element 14A. The tree structure may represent a Yet Another Next Generation (YANG) file, but this is not required. The tree structure may include any type of file that is capable of expressing the hierarchy of the resources of element 14A.

The tree structure stored by the memory of controller device 10 may represent a multi-level hierarchy of dependencies between a plurality of nodes. For example, the tree structure may originate at a root node, which represents a primary node. One or more secondary nodes may depend from the primary node, one or more tertiary nodes may depend from each secondary node, and so on. The hierarchy may include any number of levels. Each node in the tree structure may have a parent node, and each node in the tree structure may have one or more child nodes. In some examples, the tree structure may be split into a set of sub-structures, where each sub-structure of the set of sub-structures includes a branch of one or more nodes of the plurality of nodes in the tree structure. For example, a first sub-structure may originate at a first secondary node that is a child of the primary node. The first sub-structure may include every node which descends from the first secondary node. A second sub-structure may, for example, originate at a second secondary node that is a child of the primary node. The second sub-structure may include every node which descends from the second secondary node. Sub-structures represent portions of the full tree structure that defines the configuration of element 14A, so a sub-structure therefore defines a portion of the configuration of element 14A.

Controller device 10 may receive an instruction to update the configuration of any of elements 14. For example, the instruction may represent a request to update the configuration of element 14A. The instruction to update the configuration of element 14A may indicate one or more nodes present in the tree structure, where the tree structure defines the configuration of element 14A. The controller device 10 may verify the instruction based on information in the tree structure and the indicated one or more nodes in the instruction. For example, the controller device 10 may verify the instruction by confirming that the one or more nodes indicated by the instruction are present in the tree structure. When the one or more nodes indicated by the instruction are present in the tree structure, the controller device 10 may update the configuration of element 14A according to the instruction, because the controller device 10 manages resources corresponding to the one or more nodes indicated by the instruction. When the one or more nodes indicated by the instruction are not present in the tree structure, the controller device 10 may decline to update the configuration of element 14A according to the instruction since the controller device 10 might not manage resources corresponding to the one or more nodes indicated by the instruction.

It may be beneficial for controller device 10 to verify the instruction by only checking the one or more nodes identified by the instruction against a sub-structure corresponding to the one or more nodes. For example, when the instruction indicates a tertiary node that is a child of a secondary node, the controller device 10 may determine whether the tertiary node is present in a sub-structure originating at the secondary node without determining whether the tertiary node is present is other sub-structures corresponding to other secondary nodes. By determining whether the one or more nodes indicated by the instruction are present in the sub-structure corresponding to the one or more nodes without determining whether the one or more nodes are present in other sub-structures of the tree structure, controller device 10 verifies the instruction more efficiently as compared with controllers that check nodes against an entire tree structure. For example, by checking a node against only one sub-structure, the controller device 10 may consume a smaller amount of computing resources and a verify the instruction in a shorter amount of time as compared with controllers that that check a node against an entire tree structure.

In some examples, the controller device 10 receives the instruction to update the configuration of element 14A, wherein the instruction represents a remote procedure call (RPC) according to the gNMI protocol. The gNMI protocol represents a gRPC-based protocol for the modification and retrieval of the configuration of network devices such as elements 14. For example, a gNMI Set RPC instruction may cause the controller device 10 to update, replace, or delete one or more nodes in a tree structure that defines the configuration of one of elements 14. The controller device 10 may process gNMI instructions according to an underlying tree structure which identifies nodes by identifying a path, a name, and attributes for each node in the tree structure. In some examples, the tree structure includes a schema defined in the form of a file (e.g., a YANG file) which indicates references between nodes.

To compare a node indicated by an instruction to update the configuration of element 14A, controller device 10 may check the node against a configuration table. For example, a memory of controller device may store a configuration table comprising a plurality of configuration table entries, wherein each configuration table entry of the plurality of configuration table entries corresponds to a respective node of the plurality of nodes in the tree structure. In some examples, the configuration table represents a YAML Ain't Markup Language (YAML) file, but this is not required. The configuration table may represent any kind of table which is configured to store information corresponding to nodes. In some examples, the configuration table includes a plurality of configuration table entries, wherein each configuration table entry indicates any one or combination of a name, a module, a path, and a type associated with the respective node corresponding to the configuration table entry. The controller device 10 may check information corresponding to the node identified in the instruction against the information indicated by the configuration table entries in order to determine whether the node indicated by the instruction is present in the tree structure.

In some examples, an instruction to update the configuration of element 14A comprises a request to update a configuration of an existing resource of the element 14A. In some examples, the controller device 10 receives the instruction according to the gNMI protocol, but this is not required. Controller device 10 may receive the instruction according to other protocols. In some examples, to verify the instruction to update the existing resource of the element 14A, the controller device 10 is configured to identify a path identified by the instruction to update the configuration of the network device. The path may represent a path to the node in the tree structure. In other words, the path may identify a chain of one or more ancestor nodes of the node identified in the instruction. When the controller device 10 identifies the path corresponding to the identified node, then the controller device 10 may compare the identified path with the paths indicated by one or more configuration table entries of the plurality of configuration table entries. In some examples, the controller device 10 may determine, based on the identified path corresponding to the node indicated by the instruction, a sub-structure corresponding to the node indicated by the instruction. The sub-structure may correspond to a secondary node, a tertiary node, or another node in the identified path. In some cases, controller device 10 may only compare the identified path with the paths of one or more configuration table entries corresponding to nodes within the determined sub-structure. When controller device 10 determines that the identified path matches a path indicated by a configuration table entry of the one or more configuration table entries, then controller device 10 may verify that the node indicated by the instruction is present in the tree structure. When controller device 10 determines that the identified path does not match a path indicated by a configuration table entry of the one or more configuration table entries, then controller device 10 may determine that the node indicated by the instruction is not present in the tree structure, and decline to verify the instruction.

In some examples, the controller device 10 is configured to verify the instruction to update the configuration of element 14A based on determining that the path identified in the instruction corresponds to a path indicated by a configuration table entry without comparing the identified path against the tree structure itself. In other words, the controller device 10 may compare the identified path against path information in the configuration table entries without comparing the identified path to the tree structure itself. It may be beneficial for the controller device 10 to compare the identified path against the path information in the configuration table entries, because each configuration table entry includes path information corresponding to a node. Since the configuration table entries already include path information, the controller device 10 does not need to process the tree structure to determine path information in order to check whether the identified path corresponds to a node in the tree structure.

In some examples, the instruction to update the configuration of the element 14A comprises configuration information, and the controller device 10 configured to update, based on the configuration information, the configuration of the element 14A in response to verifying the instruction. The configuration information may indicate a node. In some examples, the configuration information may include a change to a name of the node, a type of the node, or a module of the node. The configuration information may include any information relating to the configuration for element 14A. The configuration information may include information for adding, deleting, or modifying a node. In any case, the controller device 10 may update the configuration of element 14A based on the configuration information.

In some examples, the instruction to update the configuration of the element 14A comprises a request to create a new resource within the element 14A. For example, the instruction to create the new resource may represent an instruction to create a network instance referencing a node indicated by the instruction. The controller device 10 is configured to determine, based on the instruction to update the configuration of element 14A, a name of the node indicated by the instruction and determine whether the plurality of configuration table entries includes a configuration table entry corresponding to a node having a name matching the name of the node indicated by the instruction. The controller device 10 may determine the name of the node indicated by the instruction by extracting the name of the node from a sub-structure of the set of sub-structures corresponding to the node. For example, controller device 10 may be configured to parse the sub-structure and generate the name of the node. Controller device 10 may update the configuration of the element 14 to include the new resource based on determining that the plurality of configuration table entries includes a name matching the name of the node indicated by the instruction. In some examples, controller device 10 may update the tree structure to indicate the new resource which references the node indicated by the instruction. Controller device 10 may also update the configuration table to include a configuration table entry for the new resource.

The memory of the controller device 10 may be configured to store a node reference table comprising a set of node reference table entries. In some examples, each node reference table entry of set of node reference table entries corresponds to a node in the tree structure that is referenced by another node of the tree structure. Each node reference table entry of set of node reference table entries may include a name of the node referenced by the referring node, and a name of the referring node. In some examples, the instruction to update the configuration of the element 14A comprises a request to delete the node indicated by the instruction. The controller device 10 is configured to determine, based on the instruction to update the configuration of the element 14A, a name of the node indicated by the instruction. Controller device 10 may determine whether the plurality of node reference table entries includes a node reference table entry corresponding to a node having a name matching the name of the node indicated by the instruction. When the plurality of node reference table entries includes a node reference table entry having a name matching the name of the node indicated by the instruction, controller device 10 may decline to fulfill the request to delete the node. Modifying a node referenced by another node may disrupt the operation of the network, so it is beneficial for controller device 10 to not delete nodes that are referenced by other nodes. When the plurality of node reference table entries does not include a node reference table entry having a name matching the name of the node indicated by the instruction, controller device 10 may fulfill the request to delete the node.

Figure 2:
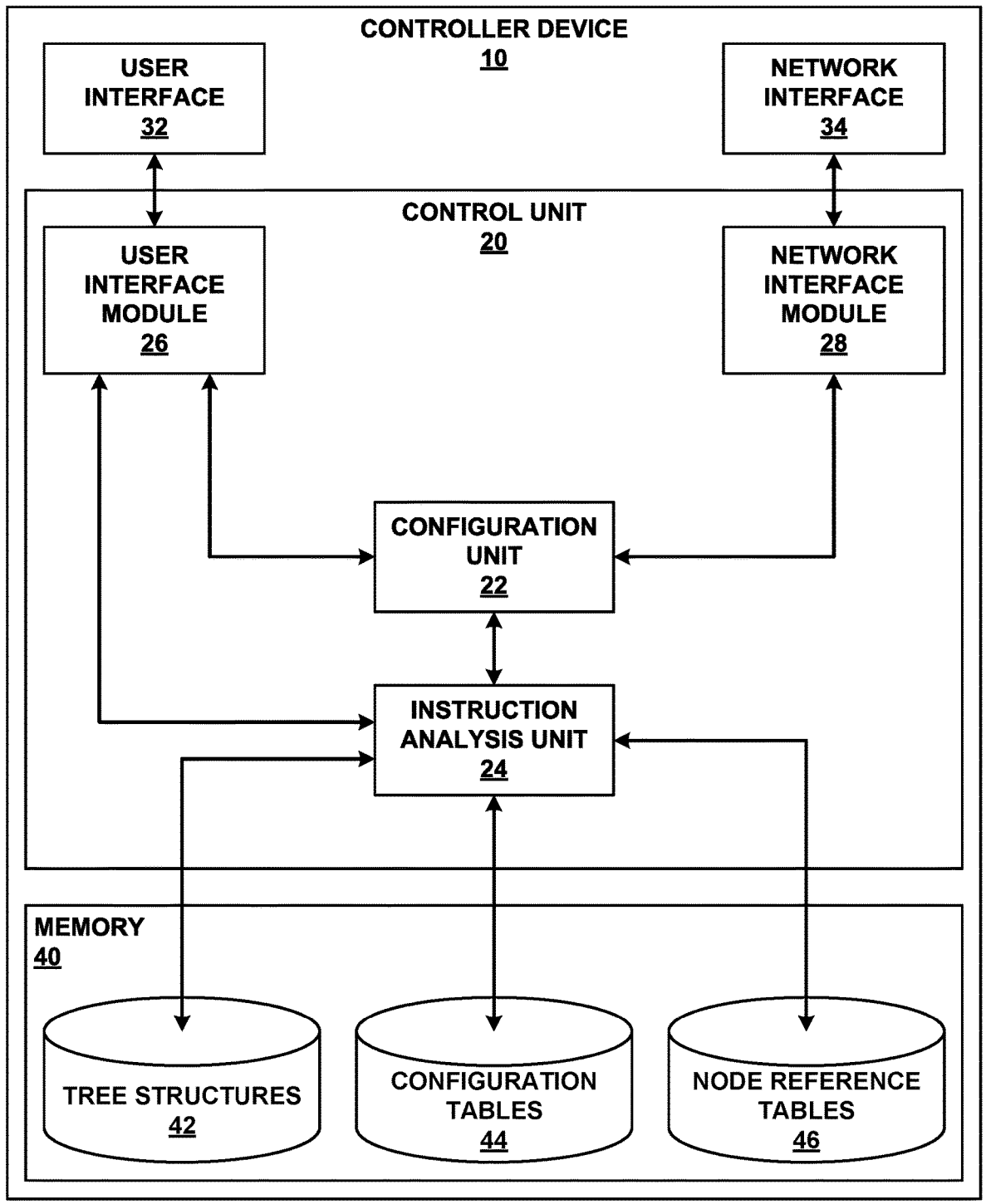
FIG. 2 is a block diagram illustrating an example set of components for the controller device of FIG. 1, in accordance with one or more techniques of this disclosure.

FIG. 2 is a block diagram illustrating an example set of components for controller device 10 of FIG. 1, in accordance with one or more techniques of this disclosure. In the example of FIG. 2, controller device 10 includes control unit 20, user interface 32, network interface 34, and memory 40. Control unit 20 includes configuration unit 22, instruction analysis unit 24, user interface module 26, and network interface module 28. Memory 40 includes tree structures 42, configuration tables 44, and node reference tables 46.

Control unit 20 represents any combination of hardware, software, and/or firmware for implementing the functionality attributed to control unit 20 and its constituent modules and elements. When control unit 20 includes software or firmware, control unit 20 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry. Processors and processing units may be referred to as "processing circuitry."

User interface 32 represents one or more interfaces by which a user, such as administrator 12 (FIG. 1) interacts with controller device 10, e.g., to provide input and receive output. For example, user interface 32 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely, e.g., via network interface 34.

Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Memory 40 may be configured to store information within controller device 10 during operation. Memory 40 may include a computer-readable storage medium or computer-readable storage device. In some examples, memory 40 includes one or more of a short-term memory or a long-term memory. Memory 40 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 40 is used to store program instructions for execution by controller device 10. Memory 40 may be used by software or applications running on controller device 10 to temporarily store information during program execution.

In this example, control unit 20 includes configuration unit 22, instruction analysis unit 24, user interface module 26, and network interface module 28. Control unit 20 executes user interface module 26 to receive input from and/or provide output to user interface 32. Control unit 20 also executes network interface module 28 to send and receive data (e.g., packets) via network interface 34. User interface module 26 and network interface module 28 may be implemented as respective hardware units, or in software or firmware, or a combination thereof.

Control unit 20 executes configuration unit 22 to configure various network devices, e.g., elements 14 of FIG. 1. For example, configuration unit 22 may configure the network devices according to instructions received from a user (e.g., administrator 12 of FIG. 1) and provide the user with the ability to submit instructions to configure the network devices. Control unit also includes an instruction analysis unit 24 configured to receive user instructions to configure elements 14 of FIG. 1 and process the instructions.

Memory 40 stores one or more tree structures 42. Each tree structure of the one or more tree structures 42 includes a plurality of nodes that define a configuration of a respective element of elements 14. For example, a tree structure of tree structures 42 may include a plurality of nodes, where each node of the plurality of nodes corresponds to a respective resource of element 14A, and requests to configure element 14A may indicate nodes of the tree structure. The tree structure may define a configuration of element 14A by defining a hierarchy of one or more resources of element 14A. In some examples, the tree structure may represent a YANG file.

In some examples, a tree structure of tree structures 42 may be separated into a set of sub-structures, where each sub-structure of the set of sub-structures includes one or more nodes of the plurality of nodes. For example, the tree structure may represent a model of various configuration knobs of the tree stricture as individually managed entities each referred to as a configuration resource. For example, "Interfaces," "Interface," "Subinterfaces," "Subinterface," "NetworkInstance," "Zone," and "FirewallPolicy" are examples of possible configuration resources of the tree structure. Each configuration resource represents a section of the tree structure. For example, below is an example schema of a tree structure of tree structures 42.

```
+--root
   +--rw interfaces
      +--rw interface* [name]
         +--rw name                  -> ../config/name
         +--rw config
         | +--rw name?
         | +--rw type
         | +--rw mtu?
         |
         |
         +--rw subinterfaces
         | +--rw subinterface* [index]
              +--rw index            -> ../config/index
              +--rw config
              | +--rw index?
              | +--rw description?
              | +--rw enabled?
      +--rw network-instances
         +--rw network-instance* [name]
```

```
        +--rw name                        -> ../config/name
        +--rw fdb
        | +--rw config
        | |      +--rw name?
        | |      +--rw mac-learning?
        | |      +--rw mac-aging-time?
        | |      +--rw maximum-entries?
        | |      +--rw oc-netinst-jfm-ext:mac-ip-aging-time?
        +--rw interfaces
        | +--rw interface* [id]
        |       +--rw id
        |       +--rw config
        |       | +--rw id?
        |       | +--rw interface?             -> /interfaces/interface/name
        |       | +--rw subinterface?          ->
/interfaces/interface[name=current( )/../interface]/subinterfaces/subinterface/index
```

The example schema illustrates a tree structure defining a hierarchy of nodes. For example, the hierarchy of nodes begins with a "root" node. An "interfaces" node and a "network-instances" node both depend from the interfaces node. That is, the interfaces node and the network-instances node are child nodes of the root node and the root node is the parent node of the interfaces node and the network-instances node. The interfaces node is the parent of one or more "interface" nodes, where each interface nodes of the one or more interface nodes define the configuration of an interface resource of element 14A. For example, each interface node may define a name and a configuration of the interface. The interface node may also define the name, type, and maximum transmission unit (MTU) parameters corresponding to the configuration of the interface. Furthermore, the interfaces node is the parent of the "subinterfaces" node, and the subinterfaces node is the parent of one or more "subinterface" nodes. Each subinterface node of the one or more subinterface nodes may indicate an index and a configuration of a respective subinterface resource of the element 14A.

The example schema may also indicate the references present within the tree structure. For example, the element/root/interfaces/interface/subinterfaces/subinterface/index may correspond to the element/root/interfaces/interface/subinterfaces/subinterface/config/index. Additionally, or alternatively, the element/root/network-instances/network-instance/interfaces/interface/config/interface may correspond to the element/root/interfaces/interface/name. Additionally, or alternatively, the element/root/network-instances/network-instance/interfaces/interface/config/subinterface may reference the element/root/interfaces/interface[name= current( )/../interface]/subinterfaces/subinterface/index. A path that comes in the square bracket after the equal sign (=) may be evaluated in the context of the referrer node. The XPath/YANG function "current( )" may select the current node/root/network-instances/network-instance/interfaces/interface/config/subinterface. The syntax ".." selects a parent of the current node. Consequently, the path "current( )/../interface" evaluates to "/root/network-instances/network-instance/interfaces/interface/config/interface." This information may populate the node reference table. The network-instances node is the parent node of one or more "network-instance" nodes. Each network-instance node of the one or more network-instance nodes may define a name and a configuration of a respective network instance resource of the element 14A. Moreover, each network-instance node may refer to one or more interface nodes or subinterface nodes of the tree structure. In some examples, the "Interface," "Subinterface," and "NetworkInstance" configuration resources are defined in the example tree structure. The Interface configuration resource may represent every node under the/interfaces/interface path of the tree structure except for the subinterface nodes. The Subinterface configuration resource may represent every node under the/interfaces/interface/subinterfaces/subinterface path of the tree structure. The NetworkInstance configuration resource may represent every node under the/network-instances/network-instance path of the tree structure.

In some examples, a tree structure of tree-structures 42 may be split into a set of sub-structures, where each sub-structure of the set of sub-structures includes a branch of one or more nodes of the plurality of nodes in the tree structure. For example, a first sub-structure may originate at a first secondary node that is a child of the primary node. The first sub-structure may include every node which descends from the first secondary node. A second sub-structure may, for example, originate at a second secondary node that is a child of the primary node. The second sub-structure may include every node which descends from the second secondary node. Sub-structures represent portions of the full tree structure that defines the configuration of element 14A, so a sub-structure therefore defines a portion of the configuration of element 14A. In this way, a sub structure may represent a configuration resource of the tree structure (e.g., Interface, Subinterface, and NetworkInstance), but this is not required. A sub-structure may represent any portion of the tree structure which originates at a node that is not the root node. For example, a sub-structure of the example tree structure may include all nodes descending from the network-instances node (e.g., all network-instance nodes and all nodes descending from a network-instance node).

Memory 40 is further configured to store one or more configuration tables 44. Each configuration table of the one or more configuration tables may correspond to a tree structure of the one or more tree structures 42. Each configuration table may include a plurality of configuration table entries, where each configuration table entry of the plurality of configuration table entries corresponds to a node of the respective tree structure. Each configuration table entry of the plurality of configuration table entries may include information concerning the respective node, such as a fully qualified name of the node, a module corresponding to the node, a path of the node within the tree structure, and a type of the node. In some examples, the one or more configuration tables 44 may represent YAML files, but this is not required. The one or more configuration tables may represent any kind of file configured to store information concerning the respective nodes. A data format of the one or more configuration tables 44 may include JSON, XML, Protobuf, or any other data format. Three example configuration table entries are reproduced below for reference.

Example Configuration Table Entry 1
fq_name: "Interface[name=% s]"
module: openconfig-interfaces
path:/interfaces/interface
type: Interface
Example Configuration Table Entry 2
fq_name: "Interface[name=% s]/Subinterface[name=% s]"
module: openconfig-interfaces
path:/interfaces/interface/subinterfaces/subinterface
type: Subinterface
Example Configuration Table Entry 3
fq_name: "NetworkInstance[name=% s]"
module: openconfig-network-instance
path:/network-instances/network-instance
type: NetworkInstance The first example configuration table entry corresponds to the "interface" node in the example tree structure. The fully qualified name "fq_name" in the first example configuration table entry is "Interface[name=% s]." In some examples, the controller device 10 may populate the "% s" characters with the name of the interface node in the example tree structure. The module of the first example configuration table entry is "openconfig-interfaces." The path of the first example configuration table entry is "/interfaces/interface." In some examples, the path indicated by the example configuration table entries does not begin at the "root" node of the tree structure so that the tree structure can be split into sub-structures. For example, the first example configuration table entry may correspond to a node that is a part of a sub-structure originating at the "interfaces" node of the tree structure. The type of the first example configuration table entry may correspond to the "Interface" configuration resource.

The second example configuration table entry corresponds to the "subinterface" node in the example tree structure. The fully qualified name in the second example configuration table entry is "Interface[name=% s]/Subinterface[name=% s]." In some examples, the controller device 10 may populate the "% s" characters with the name of the subinterface node in the example tree structure. The module of the second example configuration table entry is "openconfig-interfaces." The path of the second example configuration table entry is /interfaces/interface/subinterfaces/subinterface." The second example configuration table entry may correspond to a node that is a part of a sub-structure originating at the "interfaces" node of the tree structure. The type of the second example configuration table entry may correspond to the "Subinterface" configuration resource.

The third example configuration table entry corresponds to the "network-instance" node in the example tree structure. The fully qualified name in the third example configuration table entry is "NetworkInstance[name=% s]." In some examples, the controller device 10 may populate the "% s" characters with the name of the network-interface node in the example tree structure. The module of the third example configuration table entry is "openconfig-network-instance." The path of the third example configuration table entry is /network-instances/network-instance." The third example configuration table entry may correspond to a node that is a part of a sub-structure originating at the "network-instances" node of the tree structure. The type of the third example configuration table entry may correspond to the "NetworkInstance" configuration resource.

A fully qualified name is a unique resource name which unambiguously identifies a node. A fully qualified name for a node may include an entire hierarchical sequence leading to the node. In some examples, a fully qualified name may be shortened. For example, the fully qualified name "Interface[name=% s]/Subinterface[name=% s]" gives the name of the interface node and the index of the subinterface node which depends from the interface node. By specifying the name of the subinterface node and the index of the subinterface node, then the controller device 10 can shorten the fully qualified name to remove the root node and the interfaces node, thus shortening the fully qualified name in comparison to the gNMI path from the root node.

In some examples, control unit 20 may generate a unique name for each resource of element 14A, and propagate the unique name to the tree structures 42, configuration tables 44, and node reference tables 46. For an interface node, a unique name may be "/interfaces/interface[name=ge-0/0/3]," and a fully qualified name may be Interface[name=ge-0/0/3]. For a subinterface node, a unique name may be "/interfaces/interface[name=ge-0/0/3]/subinterfaces/subinterface[index=0]" and a fully qualified name may be "Interface[name=ge-0/0/3]/Subinterface[index=0]." For a network instance node, a unique name may be "Anterfaces/interface[name=ge-0/0/3]/subinterfaces/subinterface[index=0]" and a fully qualified name may be "Interface[name=ge-0/0/3]/Subinterface[index=0]." By maintaining the configuration tables 44, the controller device 10 does not need to traverse an entire tree structure to insert a node, the controller device 10 must insert a configuration table entry specifying a unique fully qualified name which is derived from a path of the node.

Instruction analysis unit 24 may receive, via user interface module 26, an instruction to update the configuration of any of elements 14. For example, the instruction may represent a request to update the configuration of element 14A. The instruction to update the configuration of element 14A may indicate one or more nodes present in a tree structure of tree structures 42 corresponding to element 14A. The controller device 10 may verify the instruction based on information in the tree structure and the indicated one or more nodes in the instruction. For example, the controller device 10 may verify the instruction by confirming that the one or more nodes indicated by the instruction are present in the tree structure.

In some examples, the instruction to update the configuration of element 14A represents a gNMI SetRequest. Because controller device 10 maintains a configuration table of configuration tables 44 corresponding to element 14A, the instruction analysis unit 24 does not have to traverse an entire tree structure to process the instruction. An example gNMI instruction is reproduced below for reference.

```
{
  "prefix": {
    "target": "754d549c-facb-4062-b311-13e2dd6592eb"
  },
  "replace": [
    {
      "path": {
        "origin": "",
        "elem": [
          {
            "name": "interfaces",
            "key": { }
          },
          {
            "name": "interface",
            "key": {
              "name": "ge-0/0/3"
            }
          }
        ]
      },
      "val": {
        "jsonVal": "{\"config\":{\"description\":\"Description for interface ge-0/0/4\",\"name\":\"ge-0/0/4\"}}"
      }
    }
  ]
}
```

The line "target": "754d549c-facb-4062-b311-13e2dd6592eb" indicates the network device, e.g., element 14A, corresponding to the gNMI instruction. Consequently, instruction analysis unit 24 can look up the tree structure and the configuration table corresponding to element 14A when processing the instruction. As seen in the example gNMI instruction, the instruction references the interface node with the name "ge-0/0/3." The instruction analysis unit 24 may process the gNMI instruction to determine a path to the interface node. For example, the instruction analysis unit 24 may determine that the path is "interfaces/interface." Subsequently, the instruction analysis unit 24 may compare the determined path with the paths of one or more configuration table entries corresponding to element 14A. In some examples, instruction analysis unit 24 may only check the determined path against configuration table entries corresponding to the same sub-structure as the determined path. The instruction analysis unit 24 may validate the gNMI instruction based on determining that a configuration table entry exists with the determined path of the node indicated by the gNMI instruction. If the determined path of the node indicated by the gNMI instruction does not match a path of a configuration table entry, then the instruction analysis unit may decline the gNMI instruction and return an error message via the user interface module 26 for display by the user interface 32.

Based on the instruction analysis unit 24 validating the gNMI instruction, the instruction analysis unit 24 may output an instruction for configuration unit 22 to configure element 14A according to the gNMI instruction. For example, the gNMI instruction includes the text "jsonVal": "{\"config\":{\"description\":\"Description for interface ge-0/0/4\",\"name\":\"ge-0/0/4\"}}". Configuration unit 22 may configure the resources of element 14A and update the configuration table entries to include a configuration table entry with the fully qualified name Interface[name=ge-0/0/4]. The configuration unit 22 may derive the fully qualified name from the gNMI path indicated by the gNMI instruction and the name "ge-0/0/4" indicated by the gNMI instruction.

In some examples, controller device 10 may create one or more sub-structures even when a gNMI path in an input is shorter (e.g., updating multiple config sub-structures in one element of replace/update list) or longer (e.g., updating a specific configuration knob) within a single sub-structure. In some examples, the controller device 10 may take the shorter gNMI paths and convert the shorter gNMI paths to multiple gNMI path/value pairs for a replace/update operation. If the gNMI path is longer, the controller device 10 may process the path and its JSON to create one gNMI update element that will map to a ConfigResource definition.

In some examples, instruction analysis unit 24 may receive, via user interface module 26, an instruction to update the configuration of element 14A by creating a network instance resource. The instruction analysis unit 24 is configured to determine, based on the instruction to update the configuration of element 14A, a fully qualified name of the node indicated by the instruction and determine whether the plurality of configuration table entries includes a configuration table entry corresponding to a node having a fully qualified name matching the fully qualified name of the node indicated by the instruction. An example request to create a network instance is reproduced below.

```
{
  "config": {
    "name": "ft-test",
    "type": "VIRTUAL_ROUTER",
    "description": "routing instance for ft test",
    "router-id": "1.1.1.1",
    "as": 1001
  },
  "interfaces": {
    "interface": [
      {
        "id": "ge-0/0/3.0",
        "config": {
          "id": "ge-0/0/3.0",
          "interface": "ge-0/0/3",
          "subinterface": 0
        }
      }
    ]
  }
}
```

As seen in the example request to create the network instance, the example request refers to an interface with the name "ge-0/0/3" and a subinterface with an index "0." In some examples, the instruction analysis unit 24 may extract a fully qualified name of the interface and a fully qualified name of the subinterface from the schema of the tree structure. The instruction analysis unit 24 may extract the fully qualified name "Interface[name=ge-0/0/3]" for the interface node referenced by the request to create the network instance, and the instruction analysis unit 24 may extract the fully qualified name "Interface[name=ge-0/0/3]/Subinterface[name=0]." The instruction analysis unit 24 may check the configuration table of configuration tables 44 corresponding to element 14A in order to determine whether configuration table entries exist corresponding to the interface node and the subinterface node referenced by the example request to create the network instance. When configuration table entries exist corresponding to the interface node and the subinterface node referenced by the example request to create the network instance, instruction analysis unit 24 may cause configuration unit 22 to update the configuration of element 14A to include a network instance referencing the interface node and the subinterface node. When configuration table do not exist corresponding to one or both of the interface node and the subinterface node, instruction analysis unit 24 may decline to cause configuration unit 22 to update the configuration of element 14A.

Memory 40 may store a set of node reference tables 46, wherein each node reference table of node reference tables 46 corresponds to a respective element of elements 14. In some examples, each node reference table includes a plurality of node reference table entries, each entry corresponding to a node which refers to one or more other nodes. For example, a node reference table corresponding to element 14A may include an entry for each network instance node that references another node in the tree structure corresponding to element 14A. An example of two node reference table entries is reproduced below in table 1. The table may omit references within the nodes themselves.

TABLE 1

|  | Referenced | Referrer |
|---|---|---|
| Device | Interface[name = ge-0/0/3] | NetworkInstance[name = ft-test] |
| UUID | Interface[name = ge-0/0/3]/Subinterface[index = 0] | NetworkInstance[name = ft-test] |

As seen in table 1, a network instance node with the fully qualified name "NetworkInstance[name=ft-test]" references an interface node with the fully qualified name "Interface[name=ge-0/0/3]" and a subinterface node with the fully qualified name "Interface[name=ge-0/0/3]/Subinterface[index=0]." In some examples, instruction analysis unit 24 receives an instruction to update the configuration of the element 14A by deleting a node indicated by the instruction. The instruction analysis unit 24 is configured to determine, based on the instruction to update the configuration of the element 14A, a fully qualified name of the node indicated by the instruction. Controller device 10 may determine whether a node reference table entry indicates that a node with the fully qualified name is referenced by another node. The instruction analysis unit 24 may decline to delete nodes that are referenced by other nodes such as network instance nodes.

In some examples, splitting a tree structure into multiple overlapping sections allows the controller device 10 to manage the overlapping sections independently. For example, the Interface and the Subinterface configuration resources may be contained within the "interfaces" node, and the NetworkInstance and Protocols configuration resources may be contained within network-instances node. Validating instructions to update the configuration of a network device may be more efficient when a scope of the validation is restricted as compared to when the scope of the validation is not restricted. One way to restrict the scope of the validation is to split a tree structure into one or more sub-structures, and validate an instruction against one or more of the sub-structures without validating the instruction against the entire tree.

Controller device 10 may be compatible with gNMI set operations that do not order path/value pairs according to an order required by the gNMI protocol. For example, the gNMI specification states that the order of operations is delete, replace, update. Also within the order of delete, replace and update paths, each path needs to be processed in the order in which it appears in the list. Consequently, gNMI SetRequest instructions are in the "correct" order when the path/value pairs are in the correct order. That is, referenced path/value pairs should appear before referrers in a gNMI instruction. In some examples, the controller device 10 may store the required ordering of the path/value pairs so that a client can send a gNMI instruction with the path/value pairs in any order. Subsequently, the instruction analysis unit 24 may "fix" the ordering of an incorrectly ordered gNMI instruction. The instruction analysis unit 24 may use an "edit-order" function to create or update path/value pairs and use a "delete-order" function to delete paths.

In some examples, a client device is not aware of an openconfig schema and use the proto-based interface exposed by config-service. The following code is an example of a configuration resource for a prototype-based definition of a resource of type Subinterface.

```
message SubinterfaceConfig {
    message MetaInfo {
        string interface_name = 1 [json_name = "interface-name"];
        string index = 2 [json_name = "index"];
    }
    MetaInfo meta_info = 1 [json_name = "meta-info", (module) = "openconfig-interfaces", (path) = "interfaces/interface/subinterfaces/subinterface"];
    openconfig.openconfig_interfaces.Interfaces.Interface.Subinterfaces.Subinterface subinterface = 2 [json_name = "subinterface"];
    int64 version = 3 [json_name = "version"];
}
```

Prototype-based interfaces provide controller device 10 with an Edit/Delete operation on the above resource definition. As shown above the predicates are defined in the resource to identify the openconfig module and path within the module where the resource-definition resides. The module is (module)="openconfig-interfaces," and the path is (path)="interfaces/interface/subinterfaces/subinterface."

Figure 3:
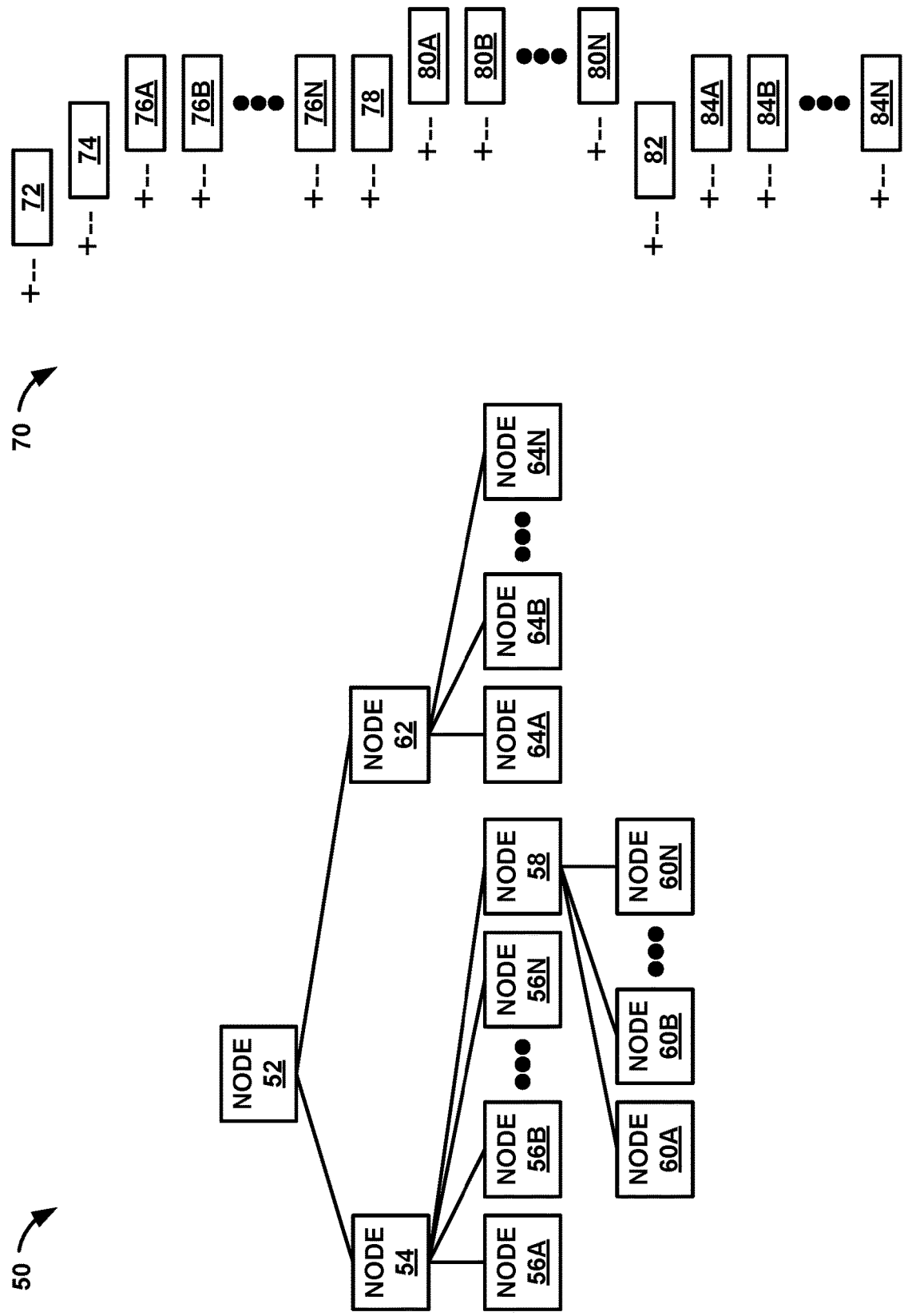
FIG. 3 is a conceptual diagram illustrating an example node hierarchy and an example schema for a tree structure, in accordance with one or more techniques of this disclosure.

FIG. 3 is a conceptual diagram illustrating an example node hierarchy 50 and an example schema for a tree structure 70, in accordance with one or more techniques of this disclosure. The node hierarchy 50 is a diagram of dependencies between nodes, and the tree structure 70 is a diagram of how the node hierarchy 50 can be represented in text. As seen in FIG. 3, the node hierarchy 50 may include node 52, node 54, nodes 56A-56N (collectively, "nodes 56"), node 58, nodes 60A-60N (collectively, "nodes 60"), node 62, and nodes 64A-64N (collectively, "nodes 64"). The tree structure 70 may include text 72, text 74, text 76A-76N (collectively, "text 76"), text 78, text 80A-80N (collectively, "text 80"), text 82, and text 84A-84N (collectively, "nodes 84"). Node hierarchy 50 may illustrate one or more dependencies between nodes. For example, node 52 is a parent node to node 54 and node 62. A parent node can have more than one child node. The node hierarchy 50 can be represented in text, as seen in tree structure 70. Text 72 may correspond to node 52, text 74 may correspond to node 52, and so on. As seen in FIG. 3, the text may be indented to indicate when a node depends from another node. For example, text 80A is indented from text 78, because node 60A depends from node 58. Tree structure 70 may be the example of one of tree structures 42 of FIG. 2.

Figure 4:
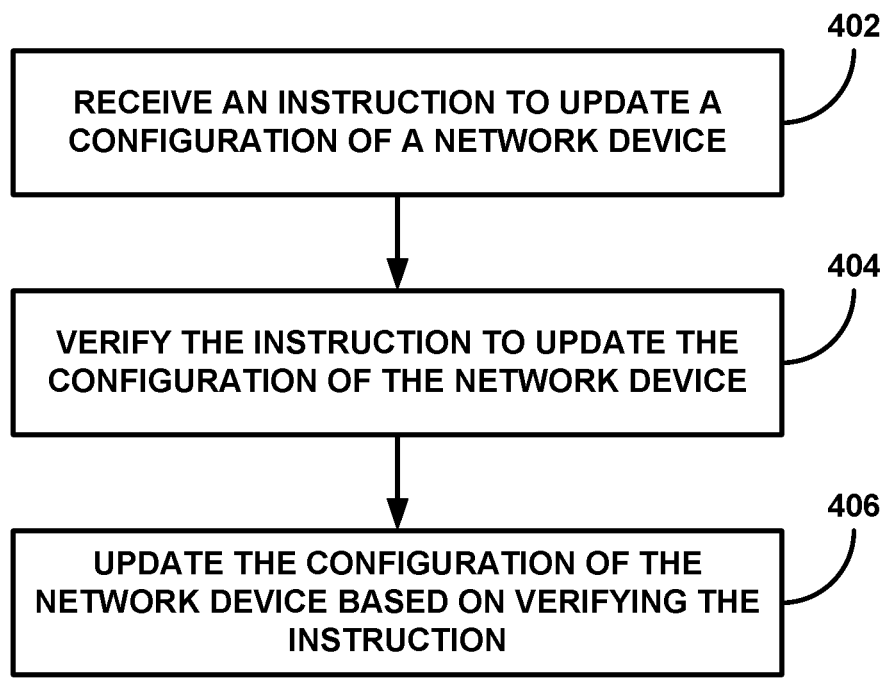
FIG. 4 is a flow diagram illustrating an example operation for verifying an instruction to update the configuration of a network device, in accordance with one or more techniques of this disclosure.

FIG. 4 is a flow diagram illustrating an example operation for verifying an instruction to update the configuration of a network device, in accordance with one or more techniques of this disclosure. For convenience, FIG. 4 is described with respect to controller device 10 and elements 14 of FIGS. 1-2. However, the techniques of FIG. 4 may be performed by different components of controller device 10 and elements 14 or by additional or alternative devices.

Controller device 10 may receive an instruction to update a configuration of a network device (e.g., element 14A) (402). The instruction may, in some cases, indicate a node of a configuration of the network device, where the node is part of a tree structure that devices the configuration of the network device. In some examples, controller device 10 may verify the instruction to update the configuration of the network device (404). In some examples, the controller device 10 may verify the instruction to update the configuration of the network device by checking the node against one or more configuration table entries corresponding to the element 14A. Each configuration table entry may correspond to a node of the tree structure. When the node matches a configuration table entry, then controller device 10 may verify the instruction. Controller device 10 may update the configuration of the element 14A based on verifying the instruction (406).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A controller device comprising:
    a memory configured to store a tree structure comprising a set of sub-structures, wherein the tree structure defines a configuration of a network device; and
    processing circuitry configured to:
        receive an instruction to update the configuration of the network device,
        wherein the instruction corresponds to a sub-structure of the set of sub-structures; and
        verify, based on the sub-structure corresponding to instruction, the instruction to update the configuration of the network device.

2. The controller device of claim 1,
    wherein each sub-structure of the set of sub-structures comprises a respective set of nodes of a plurality of nodes, and
    wherein the instruction to update the configuration of the network device indicates a node of the set of nodes corresponding to the update.

3. The controller device of claim 2, wherein each node of the plurality of nodes corresponds to a respective resource of the network device.

4. The controller device of claim 2, wherein the memory is further configured to store a configuration table comprising a plurality of configuration table entries, wherein each configuration table entry of the plurality of configuration table entries corresponds to a respective node of the plurality of nodes, and wherein each configuration table entry of the plurality of configuration table entries indicates a path to the respective node within the tree structure.

5. The controller device of claim 4, wherein the instruction to update the configuration of the network device comprises a request to update a configuration of an existing resource of the network device, and wherein to verify the instruction to update the configuration, the processing circuitry is configured to:
identify a path identified by the instruction to update the configuration of the network device; and
verify the instruction to update the configuration based on determining that the identified path corresponds to a path indicated by a configuration table entry of the plurality of configuration table entries.

6. The controller device of claim 5, wherein the processing circuitry is configured to verify the instruction to update the configuration based on determining that the identified path corresponds to a path indicated by a configuration table entry of the plurality of configuration table entries without comparing the identified path against the tree structure.

7. The controller device of claim 5, wherein the instruction to update the configuration of the network device comprises configuration information, and wherein the processing circuitry is further configured to update, based on the configuration information, the configuration of the network device in response to verifying the instruction.

8. The controller device of claim 4, wherein the instruction to update the configuration of the network device comprises a request to create a new node of the plurality of nodes, the new node referencing the node indicated by the instruction, and wherein the processing circuitry is configured to:
determine, based on the instruction to update the configuration of the network device, a name of the node indicated by the instruction; and
determine whether the plurality of configuration table entries includes a configuration table entry corresponding to a node having a name matching the name of the node indicated by the instruction.

9. The controller device of claim 8, wherein to determine the name of the node indicated by the instruction, the processing circuitry is configured to extract the name of the node indicated by the instruction from the sub-structure of the set of sub-structures corresponding to the node indicated by the instruction.

10. The controller device of claim 8, wherein the processing circuitry is configured to update the configuration of the network device to include the new node based on determining that the plurality of configuration table entries includes a configuration table entry corresponding to a node having a name matching the name of the node indicated by the instruction.

11. The controller device of claim 1,
wherein each sub-structure of the set of sub-structures comprises a respective set of nodes of a plurality of nodes,
wherein the instruction to update the configuration of the network device indicates a node of a set of nodes corresponding to the update, and
wherein the memory is further configured to store a node reference table comprising a plurality of node reference table entries, wherein each node reference table entry of the plurality of node reference table entries comprises a name of a node that is referenced by at least one other node of the plurality of nodes.

12. The controller device of claim 11, wherein the instruction to update the configuration of the network device comprises a request to delete the indicated node of the plurality of nodes, and wherein the processing circuitry is further configured to:
determine, based on the instruction to update the configuration of the network device, a name of the node indicated by the instruction; and
determine whether the plurality of node reference table entries includes a node reference table entry corresponding to a node having a name matching the name of the node indicated by the instruction.

13. The controller device of claim 12, wherein the processing circuitry is further configured to deny the request to delete the indicated node of the plurality of nodes when the plurality of node reference table entries includes a node reference table entry corresponding to a node having a name matching the name of the node indicated by the instruction.

14. A method comprising:
storing, a processor in a memory, a tree structure comprising a set of sub-structures, wherein the tree structure defines a configuration of a network device;
receiving, by processing circuitry, an instruction to update the configuration of the network device, wherein the instruction corresponds to a sub-structure of the set of sub-structures; and
verifying, by the processing circuitry based on the sub-structure corresponding to instruction, the instruction to update the configuration of the network device.

15. The method of claim 14,
wherein each sub-structure of the set of sub-structures comprises a respective set of nodes of a plurality of nodes, and
wherein the instruction to update the configuration of the network device indicates a node of the set of nodes corresponding to the update.

16. The method of claim 15, further comprising storing, by the processor in the memory, a configuration table comprising a plurality of configuration table entries, wherein each configuration table entry of the plurality of configuration table entries corresponds to a respective node of the plurality of nodes, and wherein each configuration table entry of the plurality of configuration table entries indicates a path to the respective node within the tree structure.

17. The method of claim 16, wherein the instruction to update the configuration of the network device comprises a request to update a configuration of an existing resource of the network device, and wherein verifying the instruction to update the configuration comprises:
identifying a path identified by the instruction to update the configuration of the network device; and
verifying the instruction to update the configuration based on determining that the identified path corresponds to a path indicated by a configuration table entry of the plurality of configuration table entries.

18. The method of claim 17, further comprising verifying, by the processing circuitry, the instruction to update the configuration based on determining that the identified path corresponds to a path indicated by a configuration table entry of the plurality of configuration table entries without comparing the identified path against the tree structure.

19. The controller of claim 17, wherein the instruction to update the configuration of the network device comprises configuration information, and wherein the method further comprises updating, by the processing circuitry based on the configuration information, the configuration of the network device in response to verifying the instruction.

20. A system comprising:
    a network device; and
    a controller device comprising:
        a memory configured to store a tree structure comprising a set of sub-structures, wherein the tree structure defines a configuration of the network device; and
        processing circuitry configured to:
            receive an instruction to update the configuration of the network device, wherein the instruction corresponds to a sub-structure of the set of sub-structures; and
            verify, based on the sub-structure corresponding to instruction, the instruction to update the configuration of the network device.

* * * * *